US010200087B2

(12) United States Patent
Penttila et al.

(10) Patent No.: US 10,200,087 B2
(45) Date of Patent: Feb. 5, 2019

(54) WIRELESS POWER RECEIVING COIL ALONG A LOOP OF A DEVICE

(71) Applicant: Intel Corporation, Santa Clara, CA (US)

(72) Inventors: Jani Penttila, Lempaala (FI); Marko Bonden, Tampere (FI); Tapio Liusvaara, Tampere (FI); Miikka Tuppurainen, Tampere (FI); Ismo Puustinen, Helsinki (FI)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 14/580,616

(22) Filed: Dec. 23, 2014

(65) Prior Publication Data

US 2016/0181852 A1   Jun. 23, 2016

(51) Int. Cl.
*H02J 7/00* (2006.01)
*H04B 5/00* (2006.01)
*H01F 38/14* (2006.01)
*H02J 50/10* (2016.01)

(52) U.S. Cl.
CPC ........... *H04B 5/0037* (2013.01); *H01F 38/14* (2013.01); *H02J 7/0042* (2013.01); *H02J 50/10* (2016.02); *H04B 5/0081* (2013.01)

(58) Field of Classification Search
CPC .......... Y02E 60/12; H02J 7/025; H01F 38/14; Y02T 90/122; B60L 11/182
USPC ......................................................... 320/108
See application file for complete search history.

(56) References Cited

U.S. PATENT DOCUMENTS

| | | | | |
|---|---|---|---|---|
| 2001/0043514 A1* | 11/2001 | Kita | ...................... | A44C 5/0015 368/281 |
| 2007/0064542 A1* | 3/2007 | Fukushima | ........ | G04B 37/1486 368/282 |
| 2007/0268144 A1* | 11/2007 | Dobosz | .............. | G06K 7/10386 340/572.8 |
| 2009/0270951 A1* | 10/2009 | Kallmyer | ............. | A61N 1/3787 607/61 |
| 2010/0220054 A1* | 9/2010 | Noda | ...................... | G06F 3/014 345/156 |
| 2011/0043514 A1* | 2/2011 | Hussain | ................... | G09G 5/18 345/213 |
| 2011/0062796 A1* | 3/2011 | Farahani | ................ | H01Q 1/248 307/154 |

(Continued)

FOREIGN PATENT DOCUMENTS

KR      2014004999 A      4/2014
WO      2014129024 A1     8/2014

OTHER PUBLICATIONS

PCT International Search Report, PCT No. PCT/US2015/054166, dated Jan. 22, 2016, 3 pages.

(Continued)

*Primary Examiner* — Yalkew Fantu
*Assistant Examiner* — Mohammed J Sharief
(74) *Attorney, Agent, or Firm* — International IP Law Group, P.L.L.C.

(57) ABSTRACT

Techniques for wireless charging are described herein. For example, an apparatus includes a device formed in a loop. The apparatus may also include a receiving coil disposed around an entire length of the loop. Each turn of the wireless power receiving coil follows the entire length of the loop.

18 Claims, 8 Drawing Sheets

(56) References Cited

U.S. PATENT DOCUMENTS

| | | | |
|---|---|---|---|
| 2011/0148409 A1* | 6/2011 | Aerts | A61B 5/05 324/307 |
| 2011/0222154 A1* | 9/2011 | Choi | H04N 13/0429 359/464 |
| 2013/0043734 A1* | 2/2013 | Stone | H04B 5/0037 307/104 |
| 2014/0058506 A1 | 2/2014 | Tai et al. | |
| 2014/0143933 A1* | 5/2014 | Low | G04C 10/00 2/170 |
| 2014/0247137 A1 | 9/2014 | Proud et al. | |
| 2014/0266028 A1* | 9/2014 | Telefus | H02J 7/025 320/108 |
| 2014/0312834 A1 | 10/2014 | Tanabe et al. | |
| 2014/0375246 A1* | 12/2014 | Boysen, III | H02J 5/005 320/101 |

OTHER PUBLICATIONS

Woodford, Chris, "Induction Chargers", 2007 (the year of publication is sufficiently earlier than the effective U.S. filing date and any foreign priority date so that the particular month of publication is not in issue in accordance with MPEP § 609.04(a)), Last Updated on Nov. 13, 2014, retrieved from http://www.explainthatstuff.com/inductionchargers.html. [Accessed on Mar. 20, 2015]; 8 pages.
Supplemental European Search Report for EP Patent Application No. EP 15873863 with of completion date of Jun. 28, 2018 and dated Jul. 11, 2018, 4 pages.

* cited by examiner

600

WIRELESS POWER RECEIVING COIL ALONG A LOOP OF A DEVICE

TECHNICAL FIELD

This disclosure relates generally to techniques for wireless charging. Specifically, this disclosure relates to wireless power receiving coil formed in a loop of a device.

BACKGROUND ART

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. As wearable computing devices become increasingly popular, wireless charging systems may be implemented as charging systems for wearable devices as opposed to, or even in addition to, traditional wired charging systems. However, in many cases, wearable computing devices vary in shape and size making it challenging to find a flat surface to embed a wireless power Rx coil.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for embedding a wireless power receiving (Rx) coil within a computing device having a looped shape. For example, a wearable computing device may include a bracelet having various sensors. In this scenario, the wireless power Rx coil is embedded in the loop wherein each turn of the Rx coil follows the entire length of the loop. More specifically, a first turn will follow the entire length of the loop and connect to a second turn following the entire length of the loop, and so on. The techniques described herein may improve efficiency of wireless charging as the wireless Rx coil may be relatively larger than if the wireless Rx coil did not follow the entire length of the loop.

In some cases, the techniques discussed herein may be implemented using a wireless charging standard protocol, such as the specification provided by Alliance For Wireless Power (A4WP) version 1.2.1, May 7, 2014. A wireless power Rx coil may be a component in a power receiving unit (PRU), while a wireless power Tx coil may be a component in a power transmitting unit (PTU), as discussed in more detail below.

Figure 1:
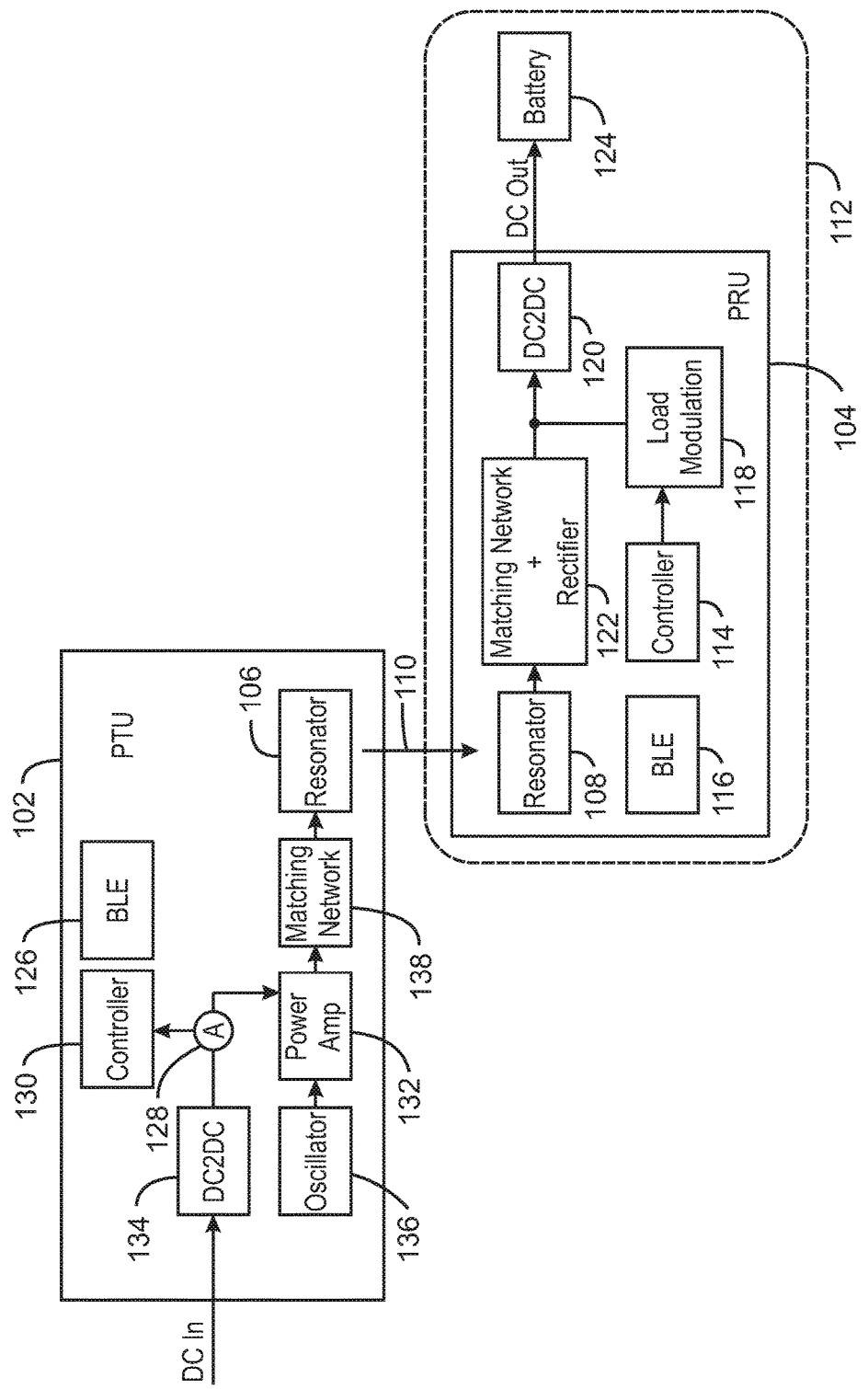
FIG. 1 is block diagram of a PTU to provide power to a PRU having an Rx coil embedded in a loop of a device.

FIG. 1 is block diagram of a PTU to provide power to a PRU having an Rx coil embedded in a loop of a device. A PTU 102 may couple to a PRU 104 via magnetic inductive coupling between resonators 106, 108, as indicated by the arrow 110. The resonator 106 may be referred to herein as a Tx coil 106 of the PTU 102. The resonator 108 may be referred to herein as a Rx coil 108 of the PRU 104.

As discussed above, the Rx coil 108, as well as other components of discussed below, may be embedded in a device having a loop, as indicated at 112. The device 112 may be a wearable device, such as a smart watch, smart bracelet, smart necklace, smart glasses, and the like. Different implementations of the device 112 are discussed below in regard to FIGS. 2-7. As illustrated and discussed in more detail below, the loop of the device 112 may be a result of a shape of the device 112. In some cases, such as in wearable computing glasses, the loop may be formed as a result of connecting ends of stems of the glasses. In any case, the device 112 includes a Rx coil 108 embedded within the loop such that each turn of the Rx coil 108 may follow an entire length of the loop.

The PRU 104 may include a controller 114 configured to detect current received at the Rx coil 108 resulting from an inductive coupling between the Tx coil 106 and the Rx coil 108. In some cases, the controller 114 may be configured to initiate a wireless data broadcast indicating a resonant frequency of the Rx coil 108. As discussed in more detail below, a length of the loop of the device 112 may be variable due to flexible portions of the loop, removable portions of the loop, foldable portions of the loop, and the like. As the length of the loop changes, the resonant frequency associated with the Rx coil 108 may also change. Therefore, the PRU 104 may include wireless data transmission component to broadcast a data signal indicating a resonance frequency of the Rx coil 108 based, in part, on the variable length.

The wireless data transmission component may be Bluetooth Low Energy (BLE) module 116 in some cases. In some cases, the wireless data transmission component may be integrated as operations of the controller 114 and a load modulation circuit 118, wherein the data transmission may be indicated by patterns in the load modulation.

Further, load modulation may be implemented via a direct current to direct current (DC2DC) converter 120 of the PRU 104. The DC2DC converter 120 is an electronic circuit configured to convert a direct current (DC) from one voltage level to another after receiving the voltage from a matching network rectifier 122. As illustrated in FIG. 1, the DC2DC converter 120 provides a DC output to a battery 124, or another current/power consuming component. The DC2DC converter 120 may convert DC received as a result of the inductive coupling of the Tx coil 106 and the Rx coil 108. In order to perform modulation, the controller 114 may direct the DC2DC converter 120 to vary the conversion such that a load is modulated and detectable by the PTU 102. In other examples, the controller 114 may turn the DC2DC converter 128 on and off, resulting in a load modulation detectable at the PTU 102. In this example, by turning off the DC2DC converter 120, the modulated load is achieved by a lower load than the normal load observed when the DC2DC converter is running normally. Other examples of a wireless broadcast, such as a load achieved by activating a shunt resistor, are contemplated by the techniques described herein. In any case, the varying resonance frequency of the Rx coil 108 due to the varying length of the loop of the device 112 may be compensated for at the PTU 102 after the wireless data broadcast signal is received at the PTU 102.

The PTU 102 may include a BLE module 126 configured to communicate with the BLE module 116. The PTU 102 may also include a current sensor 128, a controller 130, a power amplifier 132, a DC2DC converter 134, an oscillator 136, and a matching network 138. The inductive coupling 110 may cause an initial load change detected by the current sensor 128 of the PTU 102. The current sensor 128 may be an ampere meter, a volt meter, or any other meter configured to sense load variations occurring due to inductive coupling between the PTU 102 and another object, such as the PRU 104. The current sensor 128 may provide an indication of load change to a controller 130 of the PTU 102. The controller 130 may power on the power amplifier 132 configured to receive direct current (DC) from the DC2DC converter 134, and to amplify and oscillate the current. An oscillator 136 may oscillate the power provided at a given frequency and a matching network 138 may be used to match the amplified oscillation provided to the resonator 106 of the PTU 102.

The block diagram of FIG. 1 is not intended to indicate that the device 110 is to include all of the components shown in FIG. 1. Further, the device 110 or may include any number of additional components not shown in FIG. 1, depending on the details of the specific implementation, as long the device 110 may be formed in a loop having the Rx coil 108 embedded along the length of the loop, as described in more detail below.

Figure 2:
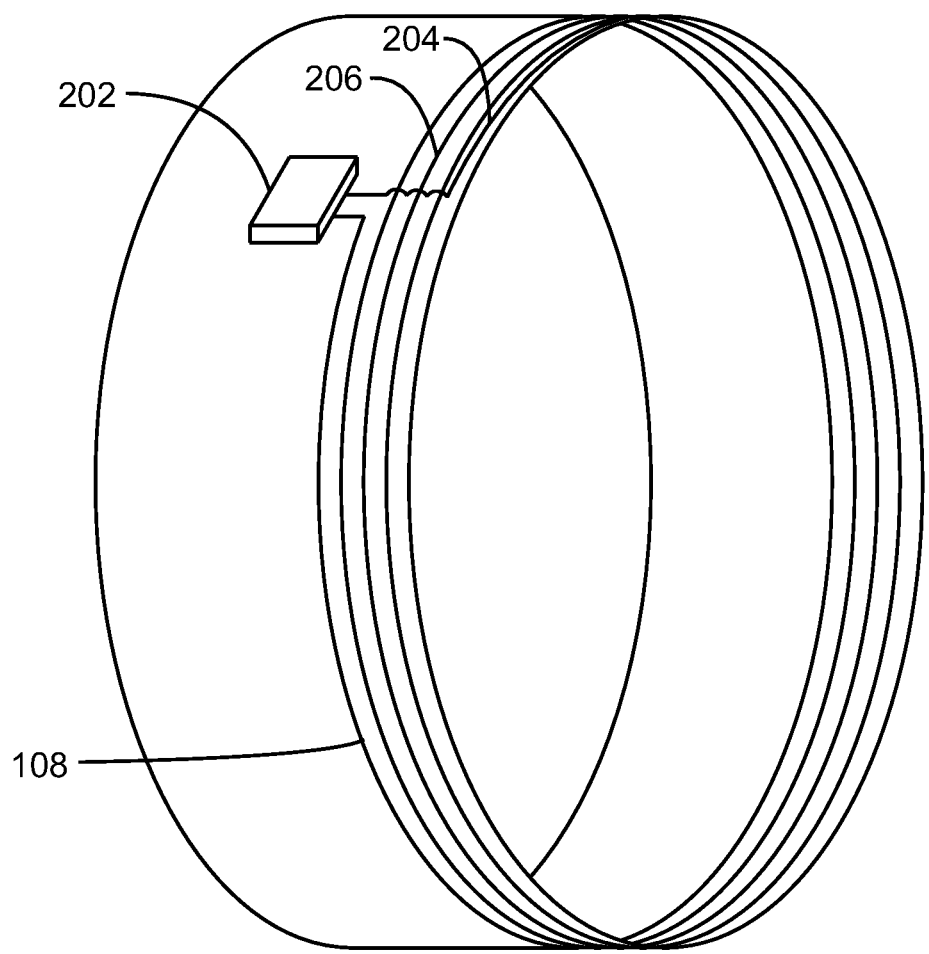
FIG. 2 is an illustration of perspective view of a device having an embedded wireless Rx coil.

FIG. 2 is an illustration of perspective view of a device having an embedded wireless Rx coil. In this example, the device 112 of FIG. 1 is a wirelessly chargeable bracelet 200 having an Rx coil, such as the Rx coil 108 of the PRU 104 of FIG. 1. The Rx coil 108 may be connected to an integrated circuit 202. The integrated circuit 202 may include one or more of the components in a PRU, such as the PRU 104 of FIG. 1. As illustrated in FIG. 2, each turn of the Rx coil 108 extends along the entire length of a loop of the wirelessly chargeable bracelet 200. For example, a first turn of the Rx coil 108 indicated at 204 follows the length the loop of the wirelessly chargeable bracelet 200, and connects to a second turn of the Rx coil 108 indicated at 206. Other examples of the device 112 of FIG. 1 may be implemented.

Figure 3:
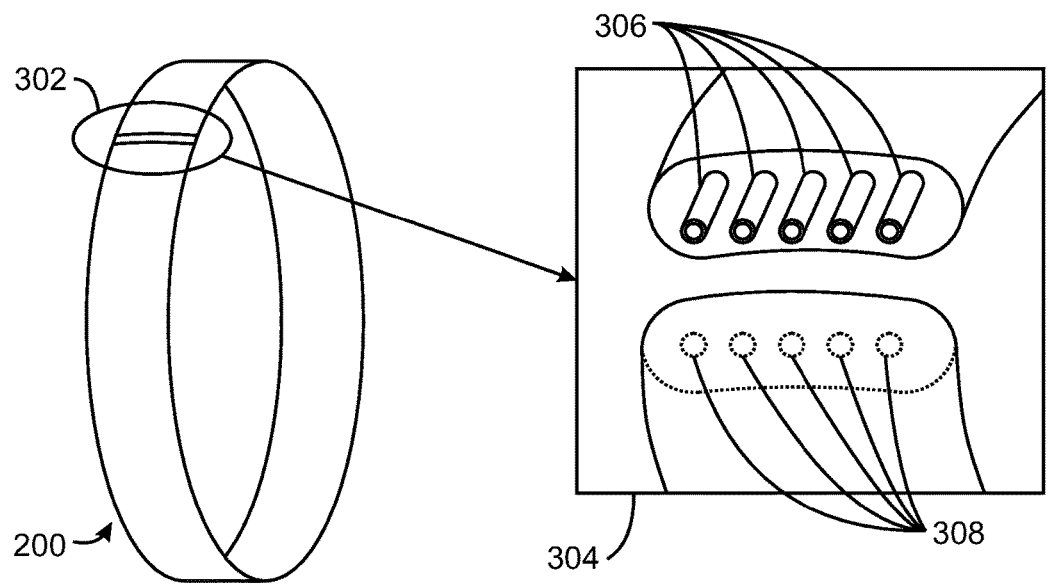
FIG. 3 is an illustration of a perspective view and a close up view of a device having an embedded wireless Rx coil and a break point.

FIG. 3 is an illustration of a perspective view and a close up view of a device having an embedded wireless Rx coil and a break point. In this example, the wirelessly chargeable bracelet, generally indicated at 200, may include a detachable section 302. As illustrated in a close up view 304, the detachable portion 302 may include detachable connectors 306 that may be received at receivers 308. In some cases, the receivers 308 may be holes defined in a cross section of the wirelessly chargeable bracelet 200. In some cases, the detachable connectors 306 may be implemented as magnetic conductive components wherein the detachable connectors 306 magnetically attach to the receivers 308. In any case, when the detachable connectors 306 are received at the receivers 308, a circuit associated with the Rx coil 108 is completed, and wireless power may be received from a PTU, such as the PTU of FIG. 1. This implementation may enable the wirelessly chargeable bracelet 200 to be removed from an arm of a user for example by opening the detachable portion.

Figure 4:
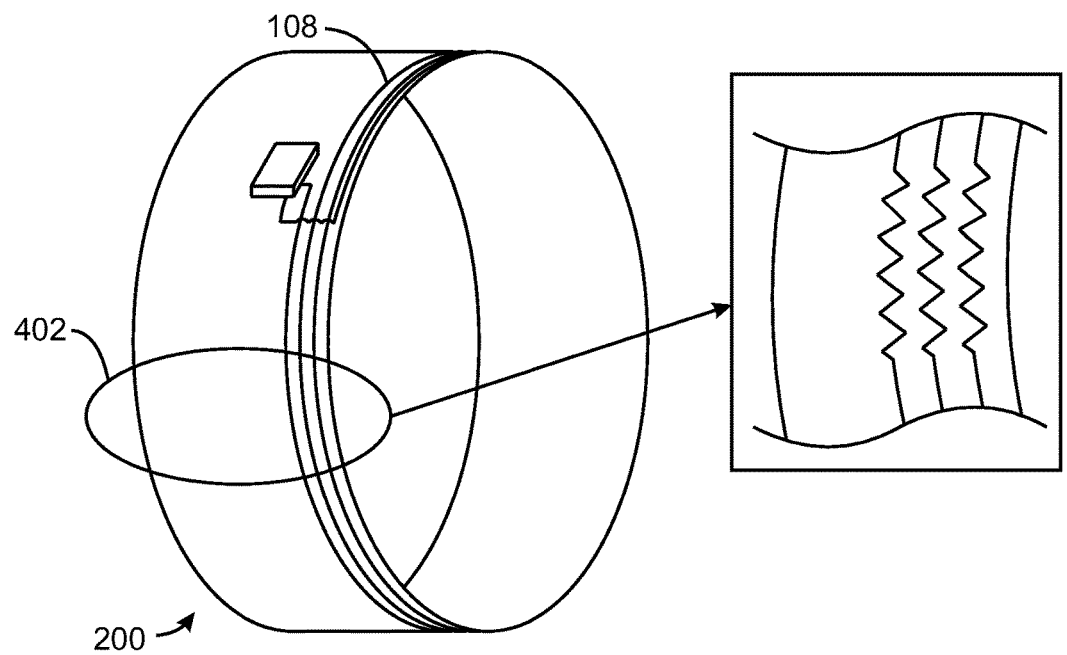
FIG. 4 is an illustration of a perspective view and a close up view of a device having an embedded wireless Rx coil and a flexible portion.

FIG. 4 is an illustration of a perspective view and a close up view of a device having an embedded wireless Rx coil and a flexible portion. As discussed above in regard to FIG. 1, the device 112 may have a loop that is composed of at least a portion of flexible material. In this scenario, the wirelessly chargeable bracelet 200 may include the Rx coil 108 having a flexible portion 402. As illustrated in the close up view 404 of the flexible portion 402 of the Rx coil 108, turns of the Rx coil 108 may be formed in a zigzag. Other formations of the flexible portion 402 may be implemented such as circular formation, a coiled formation, and the like. This implementation may enable the wirelessly chargeable bracelet 200 to be removed from an arm of a user for example by stretching the flexible portion 402.

Figure 5:
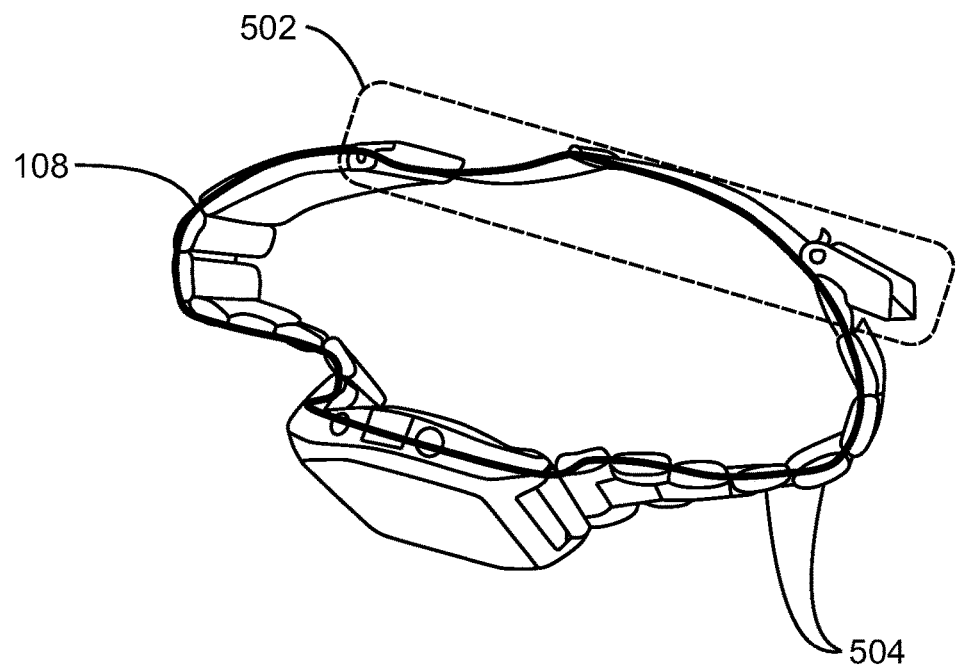
FIG. 5 is an illustration of a side view of a device having an embedded wireless Rx coil and a foldable portion.

FIG. 5 is an illustration of a side view of a device having an embedded wireless Rx coil and a foldable portion. In this example, the device 112 of FIG. 1 is a wirelessly chargeable smart watch 500 having an Rx coil, such as the Rx coil 108 of the PRU 104 of FIG. 1. A loop of the wirelessly chargeable smart watch 500 may include a foldable portion, generally indicated by the dashed box 502. In this example, the Rx coil 108 may be foldable at the foldable portion 502. This implementation may enable the wirelessly chargeable smart watch 500 to be removed an arm of a user, for example, by unfolding the foldable portion 502. Further, as indicated at 504, a band of the wirelessly chargeable smart watch 500 may include removable sections. In this scenario, removable sections 504 may be connectable by detachable connectors and receivers, such as the detachable connectors 306 and receivers 308 of FIG. 3. In some cases, the wirelessly chargeable smart watch 500 may be formed of a non-magnetic material such that the material will not interfere with wireless charging of the Rx coil 108.

Figure 6:
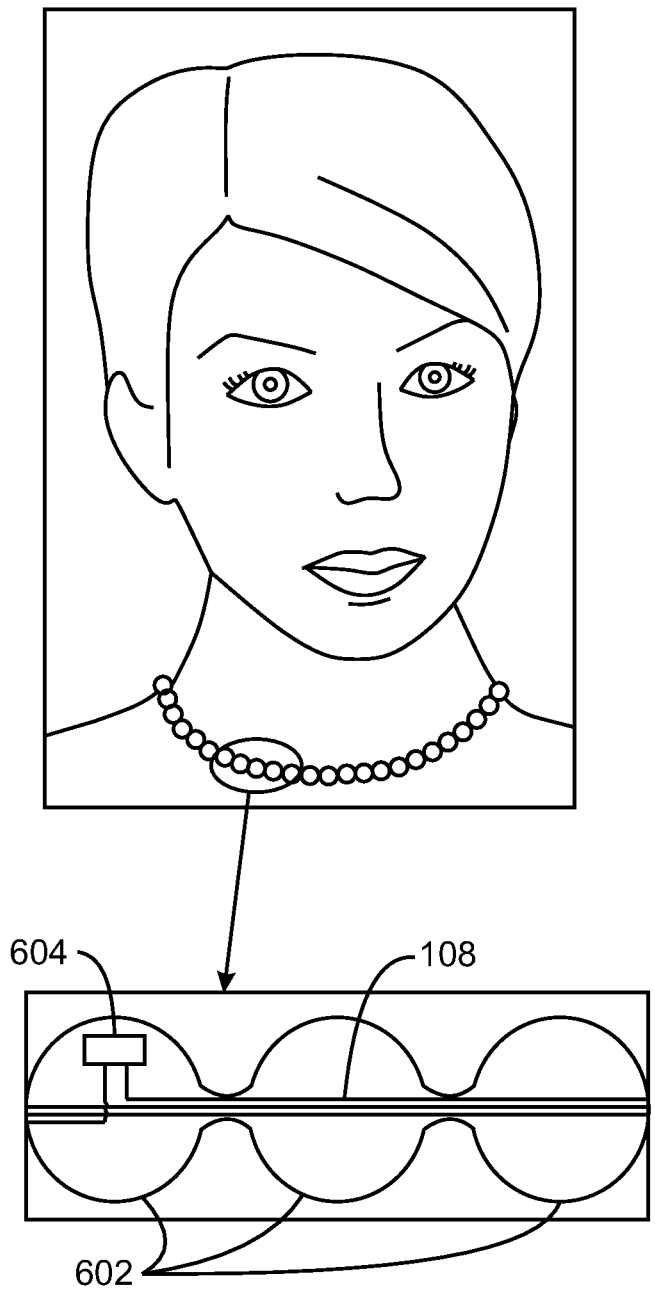
FIG. 6 is an illustration of a front view and a close up view of a device having an embedded wireless Rx coil.

FIG. 6 is an illustration of a front view and a close up view of a device having an embedded wireless Rx coil. In this example, the device 112 of FIG. 1 is a wirelessly chargeable necklace 602 having an Rx coil, such as the Rx coil 108 of the PRU 104 of FIG. 1. The Rx coil 108 may be connected to an integrated circuit 604. The integrated circuit 604 may include one or more of the components in a PRU, such as the PRU 104 of FIG. 1. As illustrated in the close up view 606, each turn of the Rx coil 108 may extend along the entire length of a loop of the wirelessly chargeable necklace 602. Although not illustrated in FIG. 6, similar to FIG. 3 and FIG. 5, the wirelessly chargeable necklace 602 may include one or removable sections, or detachable connectors between beads 608 of the wirelessly chargeable necklace 602. This implementation may enable the wirelessly chargeable necklace 602 to be removed a neck of a user, for example, by detaching the detachable connectors.

Figure 7:
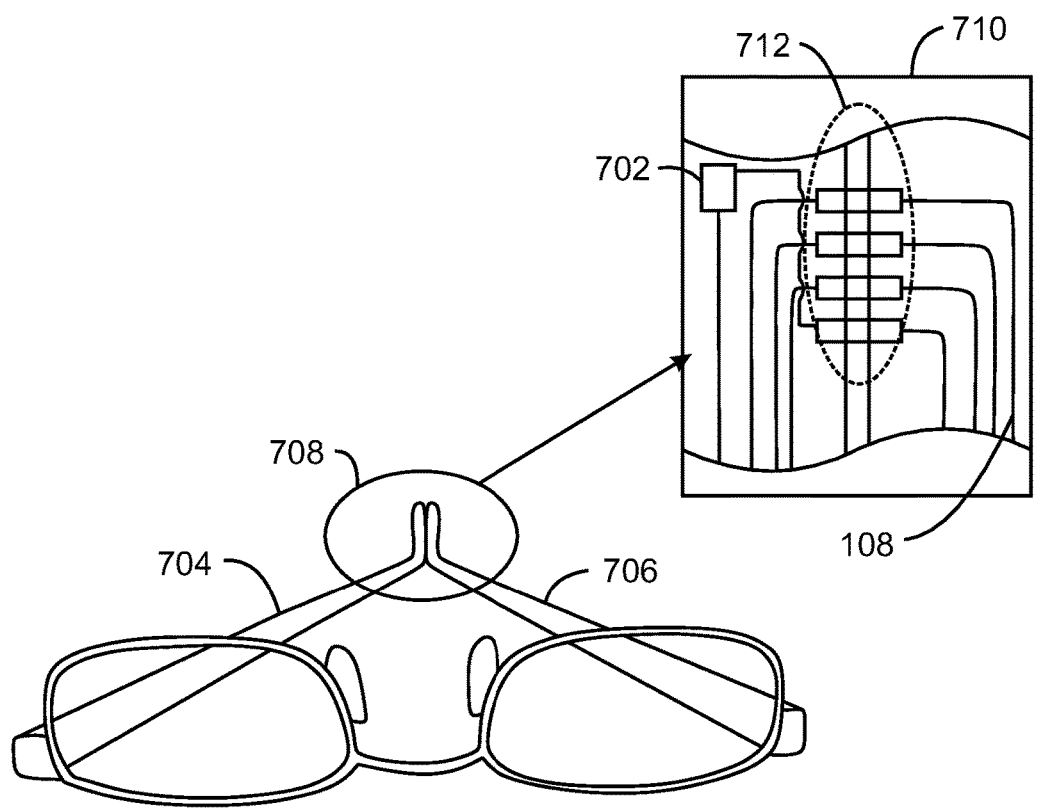
FIG. 7 is an illustration of a perspective view and a close up view of a device having an embedded wireless Rx coil and a connectable portion to close the loop.

FIG. 7 is an illustration of a perspective view and a close up view of a device having an embedded wireless Rx coil and a connectable portion to close the loop. While examples of the device 112 of FIG. 1 may be configured to be worn in a loop, the device 112 may also include devices that may be formed into a loop for wireless charging, as illustrated with a wirelessly chargeable smart glass 700 of FIG. 7. In this example, the device 112 of FIG. 1 is the wirelessly chargeable smart glass 700 having an Rx coil, such as the Rx coil 108 of the PRU 104 of FIG. 1. The Rx coil 108 may be connected to an integrated circuit 702. The integrated circuit 702 may include one or more of the components in a PRU, such as the PRU 104 of FIG. 1.

The loop may be formed by connecting stems 704 and 706 together, as indicated by the circle 708. As illustrated in the close up view 710, each turn of the Rx coil 108 may extend along the entire length of a loop of the wirelessly chargeable smart glass 700. The stems 704 and 706 may include detachable connectors and receivers, such as the detachable connectors 306 and receivers 308 of FIG. 3, as indicated by the dashed circle 712.

The implementations of the device 112 of FIG. 1 described herein may provide possibilities to increase efficiency of wireless charging. By integrating the Rx coil 108 as a part of a loop in the device 112 structure, a larger inductive area is formed, than if the Rx coil 108 was placed on a surface without each turn following the entire length of the loop. The larger area may enable a larger magnetic flux to be couple to the Rx coil 108 when placed on a charging coil, such as the PTU 102 of FIG. 1. Further, magnetic flux further away, or at an increased "Z" height from the PTU 102 may be coupled to the Rx coil 108, and some stray fields associated with the PTU 102 may be coupled to the Rx coil 108.

Figure 8:
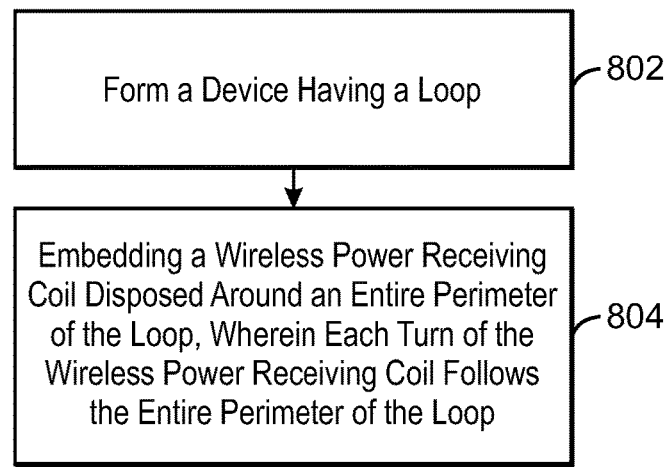
FIG. 8 is a flow diagram of a method for forming a device for wireless charging.

FIG. 8 is a flow diagram of a method for forming a device for wireless charging. The method 800 may include forming a device having a loop at block 802. As discussed above in regard to FIG. 8, the device need not be formed in a loop necessarily, but may be formed to have a loop in certain dispositions. At block 804, a wireless power receiving coil disposed around an entire length of the loop. Each turn of the wireless power receiving coil follows the entire length of the loop.

In some cases, the method may include embedding a wireless data transmission component to broadcast a data signal. As discussed above in regard to FIG. 1, the wireless data transmission component may be a BLE module, or may be implemented with load modulation via various components of a PRU, such as the PRU 104 of FIG. 1.

In some cases, the length of the loop may be formed to be variable. The broadcast data signal includes data indicating a resonance frequency of the wireless power receiving unit based, in part, on the variable length of the wireless power receiving coil.

In some cases, forming the device includes at least a portion of expandable material. In this case, the forming the wireless power receiving coil includes forming an expandable portion embedded within the portion of the expandable material of the device.

In some cases, forming the device includes forming a detachable portion. In this scenario, forming the wireless power receiving coil includes forming a detachable portion embedded within the detachable portion of the wireless power receiving coil.

In some cases, forming the device comprises forming a foldable portion. In this scenario, forming the wireless power receiving coil comprises forming a foldable portion embedded within the foldable portion of the device.

In some cases, the method 800 further includes forming detachable connectors to unloop the device. In this scenario, the detachable connectors comprise conductive connectors that when attached to each other close an electrical circuit of the wireless power receiving coil.

Further, in some cases, the method 800 includes any combination of the cases discussed above. For example, the device and coil may be formed with expandable portions, foldable portions, detachable connectors and receivers, or any combination thereof.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Example 1 includes an apparatus for wireless charging. The apparatus includes a device formed in a loop, and a wireless power receiving coil disposed around an entire length of the loop. Each turn of the wireless power receiving coil follows the entire length of the loop.

Example 1 may include any combination of the cases and situations described below. In some cases, the apparatus includes a wireless data transmission component to broadcast a data signal. A length of the loop is variable based on characteristics of the device. The broadcast data signal may include data indicating a resonance frequency of the wireless power receiving coil based, in part, on the variable length of the wireless power receiving coil.

In some cases, the device includes at least a portion of expandable material. The wireless power receiving coil may include an expandable portion embedded within the portion of the expandable material of the device.

In some cases, the device includes a detachable portion. The wireless power receiving coil may include a detachable portion embedded within the detachable portion of the wireless power receiving coil.

In some cases, the device includes a foldable portion. The wireless power receiving coil may include a foldable portion embedded within the foldable portion of the device.

In some cases, the apparatus may include detachable connectors to unloop the device. The detachable connectors comprise conductive connectors that when attached to each other close an electrical circuit of the wireless power receiving coil.

Example 2 includes a method of forming a device for wireless charging. The method may include forming a device having a loop, and embedding a wireless power receiving coil disposed around an entire length of the loop. Each turn of the wireless power receiving coil follows the entire length of the loop.

Example 2 may include any combination of the cases and situations described below. In some cases, the method includes embedding a wireless data transmission component within the device to broadcast a data signal. A length of the loop may be variable based on characteristics of the device. The broadcast data signal may include data indicating a resonance frequency of the wireless power receiving unit based, in part, on the variable length of the wireless power receiving coil.

In some cases, forming the device includes forming at least a portion of expandable material. Forming the wireless power receiving coil may include forming an expandable portion embedded within the portion of the expandable material of the device.

In some cases, forming the device includes forming a detachable portion. Forming the wireless power receiving coil comprises forming a detachable portion embedded within the detachable portion of the wireless power receiving coil.

In some cases, forming the device includes forming a foldable portion. Forming the wireless power receiving coil comprises forming a foldable portion embedded within the foldable portion of the device.

In some cases, the method may include forming detachable connectors to unloop the device. The detachable connectors comprise conductive connectors that when attached to each other close an electrical circuit of the wireless power receiving coil.

Example 3 includes an system for wireless charging. The system includes a wearable computing device formed in a loop, and a wireless power receiving coil disposed around an entire length of the loop. Each turn of the wireless power receiving coil follows the entire length of the loop.

Example 3 may include any combination of the cases and situations described below. In some cases, the system includes a wireless data transmission component to broadcast a data signal. A length of the loop is variable based on characteristics of the wearable computing device. The broadcast data signal may include data indicating a resonance frequency of the wireless power receiving coil based, in part, on the variable length of the wireless power receiving coil.

In some cases, the wearable computing device includes at least a portion of expandable material. The wireless power receiving coil may include an expandable portion embedded within the portion of the expandable material of the wearable computing device.

In some cases, the wearable computing device includes a detachable portion. The wireless power receiving coil may include a detachable portion embedded within the detachable portion of the wireless power receiving coil.

In some cases, the wearable computing device includes a foldable portion. The wireless power receiving coil may include a foldable portion embedded within the foldable portion of the wearable computing device.

In some cases, the system may include detachable connectors to unloop the wearable computing device. The detachable connectors comprise conductive connectors that when attached to each other close an electrical circuit of the wireless power receiving coil.

Example 4 includes an apparatus for wireless charging. The apparatus includes a device formed in a loop, and a means for wireless power receiving disposed around an entire length of the loop. Each turn of the means for wireless power receiving follows the entire length of the loop.

Example 4 may include any combination of the cases and situations described below. In some cases, the apparatus includes a wireless data transmission component to broadcast a data signal. A length of the loop is variable based on characteristics of the device. The broadcast data signal may include data indicating a resonance frequency of the means for wireless power receiving based, in part, on the variable length of the means for wireless power receiving.

In some cases, the device includes at least a portion of expandable material. The means for wireless power receiving may include an expandable portion embedded within the portion of the expandable material of the device.

In some cases, the device includes a detachable portion. The means for wireless power receiving may include a detachable portion embedded within the detachable portion of the means for wireless power receiving.

In some cases, the device includes a foldable portion. The means for wireless power receiving may include a foldable portion embedded within the foldable portion of the device.

In some cases, the apparatus may include detachable connectors to unloop the device. The detachable connectors comprise conductive connectors that when attached to each other close an electrical circuit of the means for wireless power receiving.

Example 5 includes a method of forming a device for wireless charging. The method may include forming a device having a loop, and embedding a means for wireless power receiving disposed around an entire length of the loop. Each turn of the means for wireless power receiving follows the entire length of the loop.

Example 5 may include any combination of the cases and situations described below. In some cases, the method includes embedding a wireless data transmission component within the device to broadcast a data signal. A length of the loop may be variable based on characteristics of the device. The broadcast data signal may include data indicating a resonance frequency of the wireless power receiving unit based, in part, on the variable length of the means for wireless power receiving.

In some cases, forming the device includes forming at least a portion of expandable material. Forming the means for wireless power receiving may include forming an expandable portion embedded within the portion of the expandable material of the device.

In some cases, forming the device includes forming a detachable portion. Forming the means for wireless power receiving comprises forming a detachable portion embedded within the detachable portion of the means for wireless power receiving.

In some cases, forming the device includes forming a foldable portion. Forming the means for wireless power receiving comprises forming a foldable portion embedded within the foldable portion of the device.

In some cases, the method may include forming detachable connectors to unloop the device. The detachable connectors comprise conductive connectors that when attached to each other close an electrical circuit of the means for wireless power receiving.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for wireless charging, comprising:
a battery powered device formed in a loop and comprising a detachable portion that enables the loop to be broken;
a wireless power receiving coil embedded within the battery powered device to charge a battery of the battery powered device and disposed around a length of the loop entirely wherein the length of the loop is variable based on at least one characteristic of the device, wherein a path of each turn of the wireless power receiving coil follows a same path as the loop entirely, wherein the wireless power receiving coil comprises a breakpoint at the detachable portion, and wherein the breakpoint comprises a connector for completing a circuit formed by the wireless power receiving coil; and
a wireless data transmission component configured to broadcast a data signal comprising data indicating a resonance frequency of the wireless power receiving coil based, at least in part, on changes in the length of the loop.

2. The apparatus of claim 1, wherein the device is comprised of at least a portion of expandable material.

3. The apparatus of claim 2, wherein the wireless power receiving coil comprises an expandable portion embedded within the portion of the expandable material of the device.

4. The apparatus of claim 1, wherein the device comprises a first detachable portion, and wherein the wireless power receiving coil comprises a second detachable portion embedded within the detachable portion of the device.

5. The apparatus of claim 1, wherein the device comprises a foldable portion, wherein the wireless power receiving coil comprises a foldable portion embedded within the foldable portion of the device.

6. The apparatus of claim 1, further comprising detachable connectors to unloop the device.

7. The apparatus of claim 6, wherein the detachable connectors comprise conductive connectors that when attached to each other close an electrical circuit of the wireless power receiving coil.

8. A method of forming a device for wireless charging, comprising:
forming a battery powered device having a loop and comprising a detachable portion that enables the loop to be broken, wherein the length of the loop is variable based on at least one characteristic of the device;
embedding a wireless power receiving coil embedded within the battery powered device to charge a battery of the battery powered device and disposed around a length of the loop, wherein a path of each turn of the wireless power receiving coil follows a same path as the loop entirely, wherein the wireless power receiving coil comprises a breakpoint at the detachable portion, and wherein the breakpoint comprises a connector for completing a circuit formed by the wireless power receiving coil; and
embedding a wireless data transmission component within the device configured to broadcast a data signal comprising data indicating a resonance frequency of the wireless power receiving coil based, at least in part, on changes in the length of the loop.

9. The method of claim 8, wherein forming the device comprises forming at least a portion of expandable material.

10. The method of claim 9, wherein forming the wireless power receiving coil comprises forming an expandable portion embedded within the portion of the expandable material of the device.

11. The method of claim 8, wherein forming the device comprises forming a first detachable portion, and wherein forming the wireless power receiving coil comprises forming a second detachable portion embedded within the detachable portion of the device.

12. The method of claim 8, wherein forming the device comprises forming a foldable portion, wherein forming the wireless power receiving coil comprises forming a foldable portion embedded within the foldable portion of the device.

13. The method of claim 8, further comprising forming detachable connectors to unloop the device.

14. The method of claim 13, wherein the detachable connectors comprise conductive connectors that when attached to each other close an electrical circuit of the wireless power receiving coil.

15. A system for wireless charging, comprising:
a wearable computing device formed in a loop and comprising a detachable portion that enables the loop to be broken wherein the length of the loop is variable based on at least one characteristic of the device;
a wireless power receiving coil embedded within the wearable computing device to charge a battery of the wearable computing device and disposed around a length of the loop, wherein a path of each turn of the wireless power receiving coil follows a same path as the loop entirely and wherein the wireless power receiving coil comprises a breakpoint at the detachable portion, wherein the breakpoint comprises a connector for completing a circuit formed by the wireless power receiving coil; and
a wireless data transmission component configured to broadcast a data signal comprising data indicating a resonance frequency of the wireless power receiving unit based, at least in part, on changes in the length of the loop.

16. The system of claim 15, wherein the characteristic comprise one or more of:
at least a first portion of expandable material, wherein the wireless power receiving coil comprises a second expandable portion embedded within the first portion of the expandable material of the device;
a first detachable portion and wherein the wireless power receiving coil comprises a second detachable portion embedded within the detachable portion of the device;
a first foldable portion, wherein the wireless power receiving coil comprises a second foldable portion embedded within the first foldable portion of the device; or
any combination thereof.

17. The system of claim 15, further comprising detachable connectors to unloop the device.

18. The system of claim 17, wherein the detachable connectors comprise conductive connectors that when attached to each other close an electrical circuit of the wireless power receiving coil.

* * * * *